United States Patent
Park et al.

(10) Patent No.: US 9,769,481 B2
(45) Date of Patent: Sep. 19, 2017

(54) METHOD AND APPARATUS FOR ENCODING OF VIDEO USING DEPTH INFORMATION

(71) Applicant: UNIVERSITY-INDUSTRY COOPERATION GROUP OF KYUNG HEE UNIVERSITY, Yongin-si, Gyeonggi-do (KR)

(72) Inventors: Gwang Hoon Park, Seongnam-si (KR); Tae Wook Kim, Suwon-si (KR); Yoon Jin Lee, Yongin-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 98 days.

(21) Appl. No.: 14/631,507

(22) Filed: Feb. 25, 2015

(65) Prior Publication Data

US 2015/0281696 A1    Oct. 1, 2015

(30) Foreign Application Priority Data

Mar. 28, 2014  (KR) .......................... 10-2014-0037275
May 16, 2014  (KR) .......................... 10-2014-0059063

(51) Int. Cl.
*H04N 19/136* (2014.01)
*H04N 19/124* (2014.01)
(Continued)

(52) U.S. Cl.
CPC ......... *H04N 19/124* (2014.11); *H04N 19/119* (2014.11); *H04N 19/136* (2014.11);
(Continued)

(58) Field of Classification Search
CPC ...... H04N 19/136; H04N 19/51; H04N 19/91; H04N 19/124; G06T 7/0051
See application file for complete search history.

(56) References Cited

U.S. PATENT DOCUMENTS

2011/0038419 A1 *  2/2011  Han ..................... H04N 19/176
                                                          375/240.16
2013/0301705 A1 * 11/2013  Seregin ................ H04N 19/129
                                                          375/240.02
(Continued)

FOREIGN PATENT DOCUMENTS

KR   10-2012-0018915 A    3/2012
KR   10-2012-0137305 A   12/2012
(Continued)

OTHER PUBLICATIONS

HEVC Encoder Optimization using Depth Information, "Kyung Hee University Graduate School".
(Continued)

*Primary Examiner* — Shawn An
(74) *Attorney, Agent, or Firm* — Sughrue Mion, PLLC

(57) ABSTRACT

Provided is a method for encoding an image using a depth information that includes selecting a current coding unit (CU); verifying an object information of the current CU from an object information obtained from a depth image; and verifying whether or not the current CU is composed of a single object based on the object information, and predicting a division structure of the current CU according to whether or not the current CU is composed of a single object.

6 Claims, 16 Drawing Sheets

(51) Int. Cl.
  *H04N 19/51*  (2014.01)
  *H04N 19/597*  (2014.01)
  *H04N 19/119*  (2014.01)
  *H04N 19/172*  (2014.01)
  *H04N 19/167*  (2014.01)
  *H04N 19/91*  (2014.01)

(52) U.S. Cl.
  CPC ......... *H04N 19/167* (2014.11); *H04N 19/172* (2014.11); *H04N 19/51* (2014.11); *H04N 19/597* (2014.11); *H04N 19/91* (2014.11)

(56) References Cited

U.S. PATENT DOCUMENTS

2014/0085416 A1* 3/2014 Chang ................ H04N 13/0048
                 348/43
2015/0296197 A1* 10/2015 Paark ................ H04N 13/0048
                 382/154

FOREIGN PATENT DOCUMENTS

KR  10-2014-0008984 A  1/2014
KR  10-2014-0048784 A  4/2014

OTHER PUBLICATIONS

Korean Notice of Allowance for corresponding Application No. 10-2014-0059063 issued Dec. 24, 2015.

* cited by examiner

1900

METHOD AND APPARATUS FOR ENCODING OF VIDEO USING DEPTH INFORMATION

CROSS-REFERENCE TO RELATED APPLICATION

The present invention claims the benefit of Korean Patent Application No. 10-2014-0037275, filed Mar. 28, 2014, and Korean Patent Application No. 10-2014-0059063, filed May 16, 2014, the contents of all of which are incorporated herein by reference in their entirety.

BACKGROUND

Technical Field

The present disclosure relates to an encoding of a video using a depth information, and more particularly, to a method and an apparatus of inducing an object information and efficiently encoding an image using a depth information.

Discussion of the Related Art

A depth information image has been widely used in an encoding of a three-dimensional video, and a depth information camera of a new input device such as a Kinect camera of an Xbox game machine, an Intel SENZ3D webcam, an iSense 3D scanner of an iPad and a Google Tango Smartphone may be used for various 3D and 2D applications.

In addition, 2D/3D application has been popularized through various 2D/3D services due to popularization and dissemination of the depth information camera. As a result, a future multimedia camera system may include the depth information camera to utilize a variety of information.

Patent documents of the prior art documents are as follows: (patent document 1) US 2014/0085416 (Title of the Invention: METHOD AND APPARATUS OF TEXTURE IMAGE COMPRESS IN 3D VIDEO CODING); (patent document 2) KR 10-2012-0137305 (Title of the Invention: METHOD OF DIVIDING BLOCKS AND APPARATUS USING THE SAME); and (patent document 3) KR 10-2014-0048784 (Title of the Invention: METHOD AND APPARATUS OF INDUCING MOTION INFORMATION BY SHARING RESTRICTIVE DEPTH INFORMATION VALUE).

SUMMARY

Embodiments of the present disclosure relate to a method and an apparatus of encoding a video using a depth information. Accordingly, one exemplary embodiment is directed to a method and an apparatus for encoding a video that substantially obviates one or more of the problems due to limitations and disadvantages of the related art.

One exemplary embodiment is a method and an apparatus of encoding a video where deterioration in performance is prevented and efficient encoding is obtained by using a depth information when a two-dimensional video is encoded.

Advantages and features of the disclosure will be set forth in part in the description, which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

To achieve other advantages and features in accordance with the purpose according to one aspect of the disclosure, a method for encoding an image using a depth information includes selecting a current coding unit (CU); verifying an object information of the current CU from an object information obtained from a depth image; and verifying whether or not the current CU is composed of a single object based on the object information, and predicting a division structure of the current CU according to whether or not the current CU is composed of a single object.

In another aspect, a method for encoding an image using a depth information includes selecting a current coding unit (CU); judging whether or not the current CU is composed of a single object when a size of the current CU is equal to or a predetermined value; and verifying an object information of a peripheral CU of the current CU or an object information of a reference CU of the current CU, and predicting a division structure of the current CU based on the object information of the peripheral CU or the object information of the reference CU, when the current CU is composed of a single object.

In another aspect, a method for encoding an image using a depth information includes obtaining an object information of a largest coding unit (LCU) from a depth image; predicting division structure candidates of the LCU based on the object information; and deciding an optimum division structure among the division structure candidates of the LCU based on at least one of coding efficiency and display quality.

In another aspect, an apparatus for encoding an image using a depth information includes an object information verifying portion that verifies an object information of a current coding unit (CU) from an object information obtained from a depth image; and a division structure prediction portion that verifies whether or not the current CU is composed of a single object based on the object information, and predicts a division structure of the current CU according to whether or not the current CU is composed of a single object.

In another aspect, an apparatus for encoding an image using a depth information includes an object information verifying portion that verifies a size of a current coding unit (CU), and verifies whether or not the current CU is composed of a single object based on an object information of the current CU obtained from a depth image when the size of the current CU is equal to or a predetermined value; and a division structure prediction portion that verifies an object information of a peripheral CU of the current CU or an object information of a reference CU of the current CU, and predicts a division structure of the current CU based on the object information of the peripheral CU or the object information of the reference CU, when the current CU is composed of a single object.

In another aspect, A method for encoding an image using a depth information includes an objection information verifying portion that verifies an object information of a largest coding unit (LCU) from a depth image; a division structure prediction portion that predicts division structure candidates of the LCU based on the object information; and an optimum division structure decision portion that decides an optimum division structure among the division structure candidates of the LCU based on at least one of coding efficiency and display quality.

It is to be understood that both the foregoing general description and the following detailed description are exemplary and explanatory, and are intended to provide further explanation of the embodiments as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

DETAILED DESCRIPTION

Figure 1:
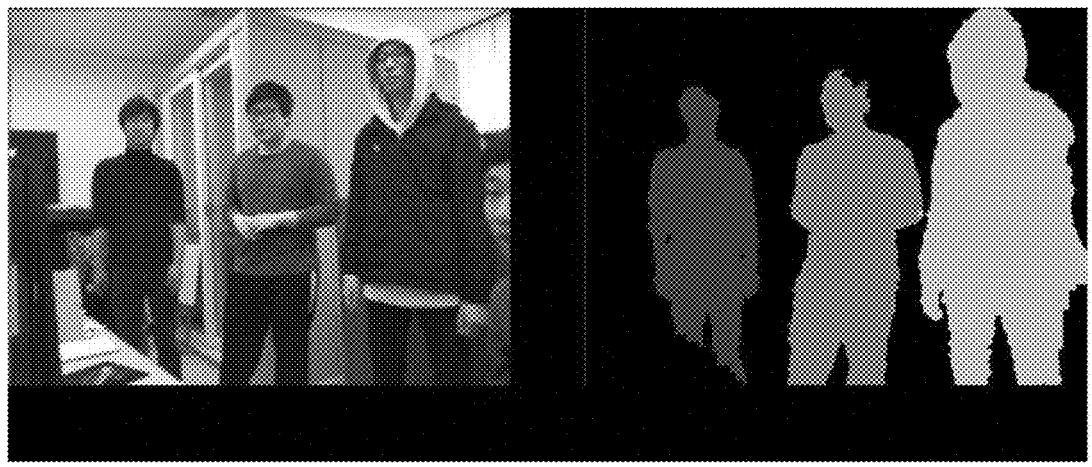
FIG. 1 is an exemplary view showing a general image and a depth information map of a general image.

Reference will now be made in detail to embodiments of the present disclosure, examples of which are illustrated in the accompanying drawings. In the following description, when a detailed description of well-known functions or configurations related to this document is determined to unnecessarily cloud a gist of an embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
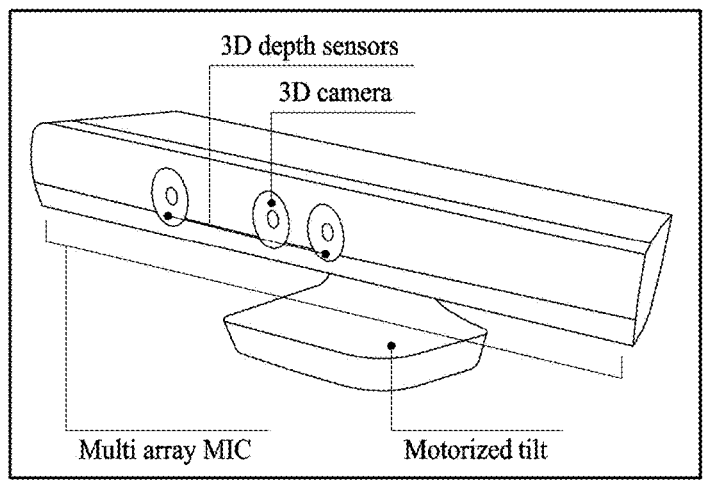
FIG. 2 is an exemplary view showing a Kinect input device.

FIG. 1 is an exemplary view showing a general image and a depth information map of a general image, and FIG. 2 is an exemplary view showing a Kinect input device.

In FIG. 1, the left view shows a real image taken by a camera, and the right view shows a depth image of a real image, i.e. a depth information image (or a depth information map). The depth information means an information of a real distance between the camera and the object.

The depth information image is mostly used for generating a three-dimensional virtual viewpoint image. A standardization of a three-dimensional video as a relating research is now progressing in the JCT-3V (Joint Collaborative Team on 3D Video Extension Development), which is a joint standardization group of the MPEG (Moving Picture Experts Group) of ISO/IEC and the VCTE (Video Coding Experts Group) of ITU-T.

The standard of a three-dimensional video includes a progressed data format, which can support play of an autostereoscopic image as well as a stereoscopic image using a general image and a depth information image thereof, and a standard for the relating technology.

The Microsoft launched the Kinect sensor as a new input device for the XBOX-360 game machine in the November of 2010. In FIG. 2, the Kinect input device perceives and transmits a movement of a person to a computer system and includes a 3D depth sensor as well as an RGB camera. In addition, the Kinect input device generates and provides an RGB image and a depth information map (a depth map) up to 640×480 to the connected computer system. In year 2014, further, the Intel presented 720p CREATIVE SENZ3D webcam having a depth sensor of 320×240 for a notebook computer, the Apple launched an iSense as a 3D scanner for an iPad using an RGB camera and a depth sensor, and the Google presented a Tango Smartphone having a depth sensor.

Figure 3:
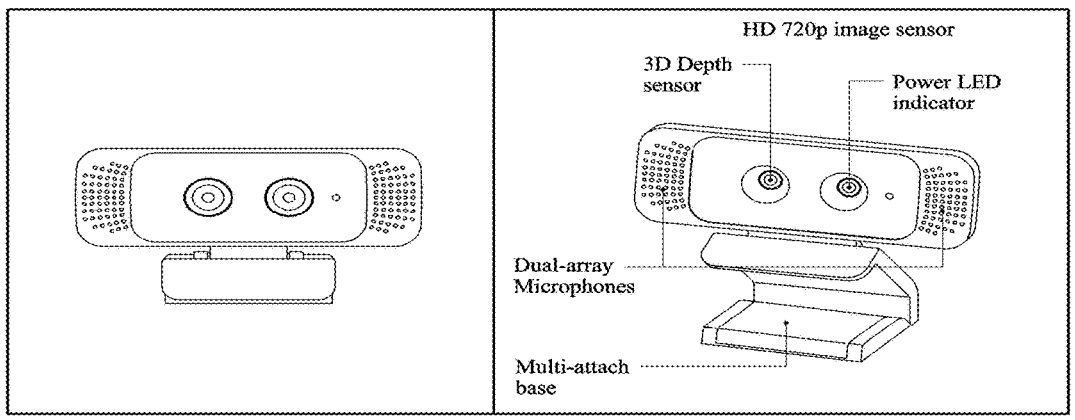
FIG. 3 is a view showing a CREATIVE SENZ3D webcam.

FIG. 3 is a view showing a CREATIVE SENZ3D webcam.

In FIG. 3, the left view shows a product of the SENZ3D webcam, and the right view shows a prototype of the SENZ3D webcam.

Figure 4:
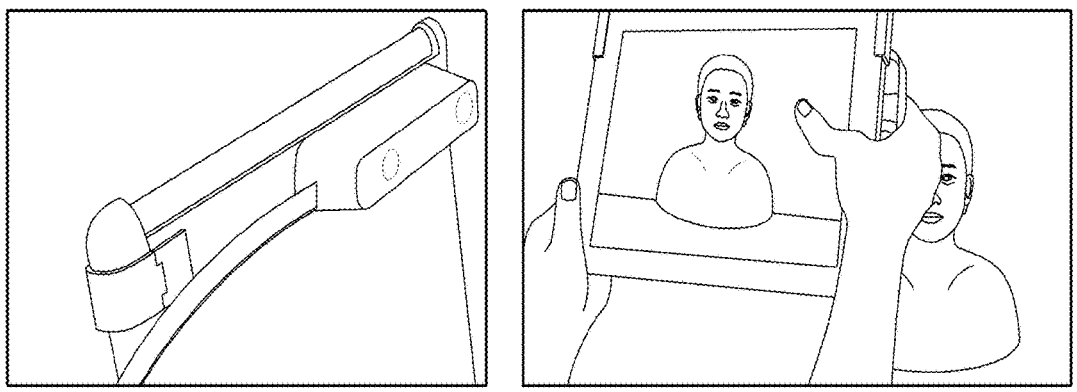
FIG. 4 is a view showing an iSense 3D scanner device.
Figure 5:
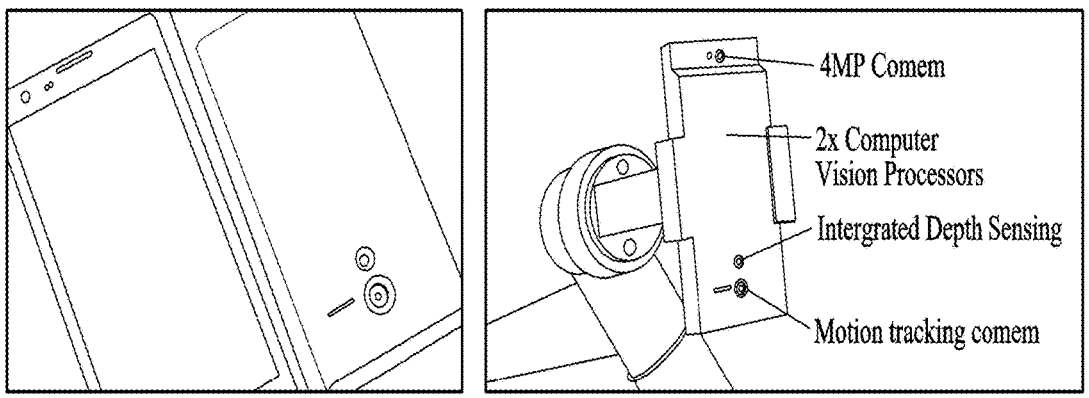
FIG. 5 is a view showing a Google Tango Smartphone.

FIG. 4 is a view showing an iSense 3D scanner device, and FIG. 5 is a view showing a Google Tango Smartphone.

In FIG. 4, the left view shows a product of the iSense, and the right view shows a scanning treatment through the iSense. In FIG. 5, the left view shows a product of the Google Tango Smartphone, and the right view shows a prototype of the Google Tango Smartphone.

The advent of an image device such as the Kinect, the iSense 3D scanner, the Intel SENZ3D webcam and the Google Tango Smartphone serves as a momentum for a public enjoyment of various applications such as two-dimensional and three-dimensional games or an image service and shows that a video device having a depth information camera or sensor becomes popular.

It is forecast that the video system is developed as a device where a general image camera is combined with a depth camera for basically supplying a two-dimensional and three-dimensional application image service as well as a two-dimensional general image service or an assist device in a handheld system.

The video system, where the general image camera and the depth camera are basically combined, is new method using the depth information in a three-dimensional video codec as well as a two-dimensional video codec.

In addition, encoding of a general image is performed by using a typical video codec intactly in the camera system including the depth information camera. For example, the typical video codec may include MPEG-1, MPEG-2, MPEG-4, H.261, H.262, H.263, H.264/AVC, MVC, SVC, HEVC, SHVC, 3D-AVC, 3D-HEVC, VC-1, VC-2 and VC-3, and the general image may be encoded by using the other various codecs.

Figure 6:
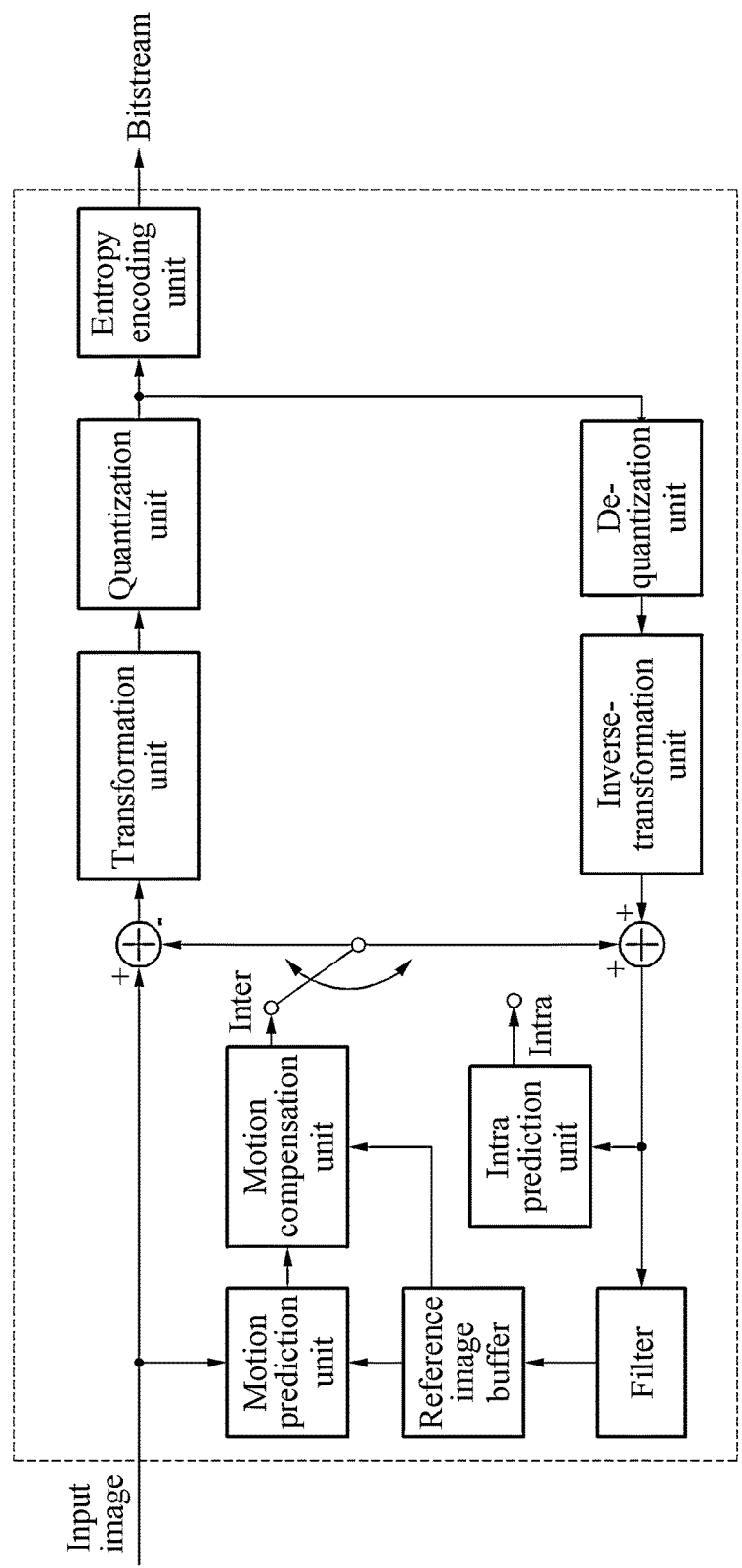
FIG. 6 is a view showing an encoding apparatus using HEVC.

FIG. 6 is a view showing an encoding apparatus using HEVC.

As an exemplary method of encoding a real image and a depth information map thereof, encoding may be performed by using HEVC (High Efficiency Video Coding) where standardization is completed jointly in MPEG (Moving Picture Experts Group) and VCEG (Video Coding Experts Group) having a maximum coding efficiency among video coding standards that have been developed up to the present. The HEVC includes various algorithms such as a unit and a structure of encoding, an inter prediction between images, an intra prediction in an image, an interpolation, a filtering and a transformation. FIG. 6 shows an example of a structure of an image encoding apparatus using the HEVC.

In FIG. 6, a SAO (Sample Adaptive Offset) may be disposed between a filter and a reference image buffer. The SAO may add an optimum offset value to a pixel value for compensating a coding error.

Since the HEVC performs an inter prediction encoding, i.e. a prediction encoding between images, it is necessary to decode and store the present encoded image for using as a reference image. Accordingly, a quantized coefficient is de-quantized in a de-quantization unit and is inversely transformed in an inverse-transformation unit. A de-quantized and inversely-transformed coefficient is added to a prediction block by an adder and a restoration block is generated. The restoration block through the filter is stored in the reference image buffer.

Figure 7:
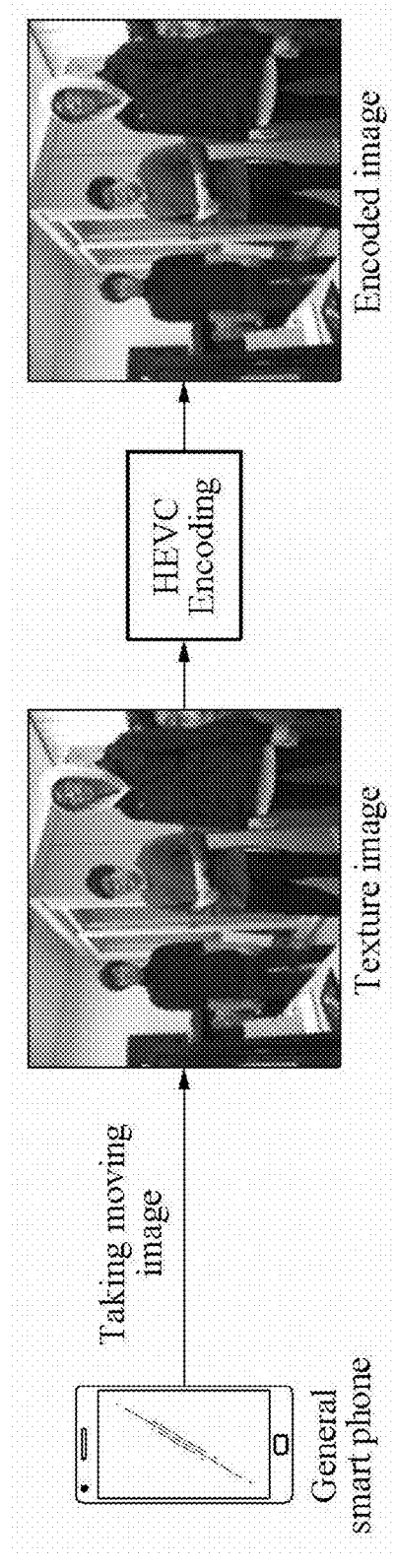
FIG. 7 is a view showing an exemplary encoding of an image by HEVC in a smart phone.
Figure 8:
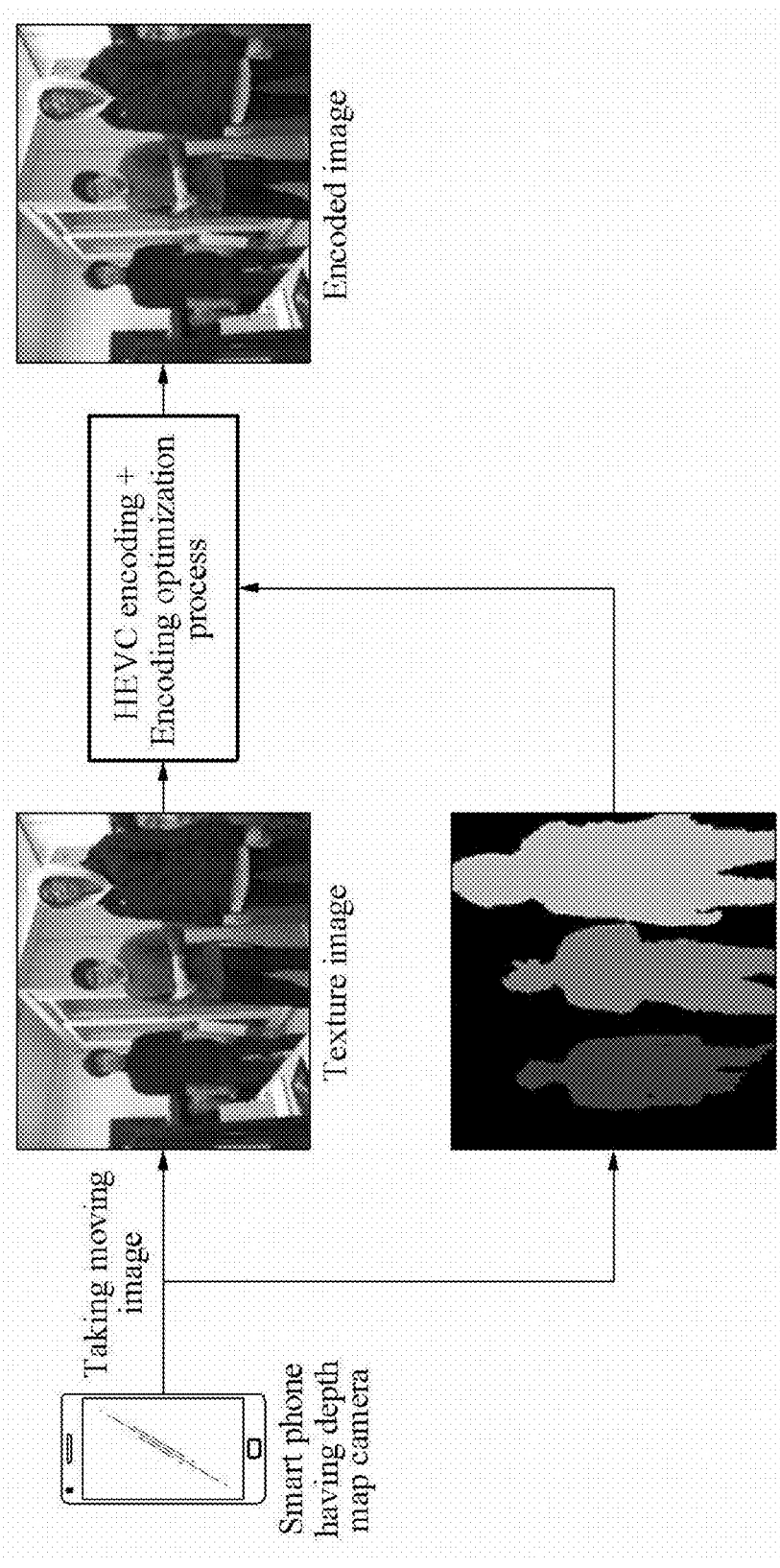
FIG. 8 is a view showing an exemplary encoding of an image by HEVC with a depth image in a smart phone.

FIG. 7 is a view showing an exemplary encoding of an image by HEVC in a smart phone, and FIG. 8 is a view showing an exemplary encoding of an image by HEVC with a depth image in a smart phone.

Referring to FIG. 7, in a smart phone including an HEVC encoder, an image taken by the smart phone is encoded by the HEVC encoder and a service is provided by using the encoded image.

Referring to FIG. 8, in a smart phone including a depth camera, a general image (a texture image) and a depth image are independently generated by the smart phone and an improved encoded image is obtained due to reduction of complexity by the HEVC encoder through optimization using a correlation between the texture image and the depth image.

Although the patent document 1 (US 2014/0085416) discloses a structure of verifying the information regarding the object of the present block from the depth map and merging the blocks, the patent document 1 (US 2014/0085416) does not disclose how the coding unit is divided and encoded using the depth information at all.

In addition, the patent document 2 (KR 10-2012-0137305) and the patent document 3 (KR 10-2014-0048784) does not disclose a content using the depth map at all, or does not clearly suggest a constitution for predicting a division structure of CU.

Figure 9:
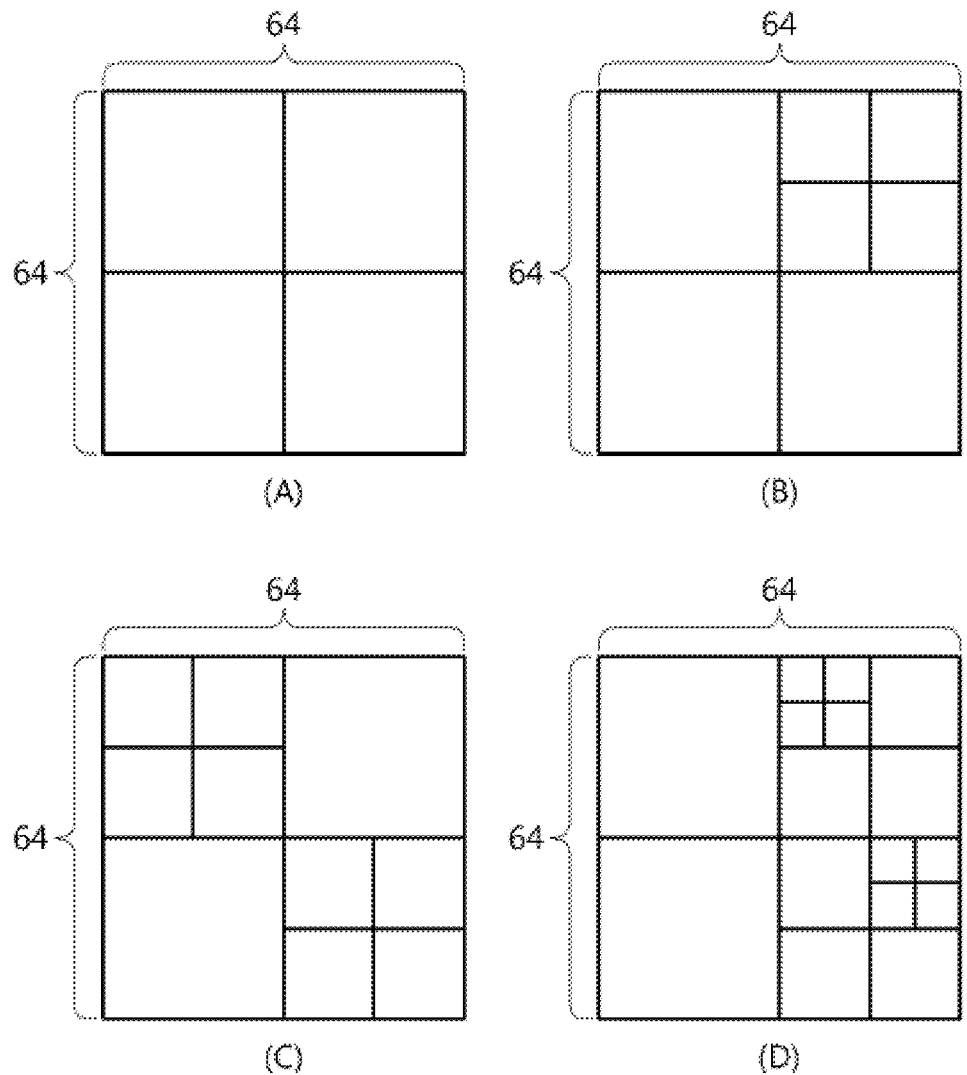
FIG. 9 is a view showing examples of dividing an image into a plurality of units.

FIG. 9 shows examples of dividing an image into a plurality of units.

In a method of encoding a video with high efficiency, an encoding is performed by dividing an image into a largest coding unit (LCU) which is a fundamental unit of a coding unit (CU). Although the coding unit (CU) performs a role similar to a macro block (MB) which is a fundamental block of H.264/AVC of a typical video codec, the CU may have a variable size differently from the MB having a fixed size of 16×16. In addition, the LCU which is divided for encoding may be divided again into a plurality of CUs each having a size smaller than the LCU for efficient encoding.

Referring to FIG. 9, the LCU having a size of 64×64 may be divided into a plurality of CUs through various ways. FIG. 9(A) shows an example of dividing an LCU having a size of 64×64 and a division depth of 0 into a plurality of CUs each having a size of 32×32 and a division depth of 1. FIG. 9(B) shows an example of dividing one of a plurality of CUs each having a size of 32×32 into a plurality of CUs each having a division depth of 2, and FIG. 9(C) shows an example of dividing two of a plurality of CUs each having a size of 32×32 into a plurality of CUs each having a division depth of 2. FIG. 9(D) shows an example including a plurality of CUs each having a division depth of 3. Accordingly, a division structure candidate of LCU or CU may exist in various ways.

A division structure of LCU is a division information of a coding unit. After various division structures as mentioned above are generated and stored in a division structure candidate, one division structure of a division structure candidate of LCU is selected by LCU as an optimum LCU division structure at a step of determining an optimum LCU division structure. Since the encoding is performed on the basis of the adaptive LCU division structure in accordance with an image property by LCU, efficient encoding may be performed in coding efficiency and image quality.

Figure 10:
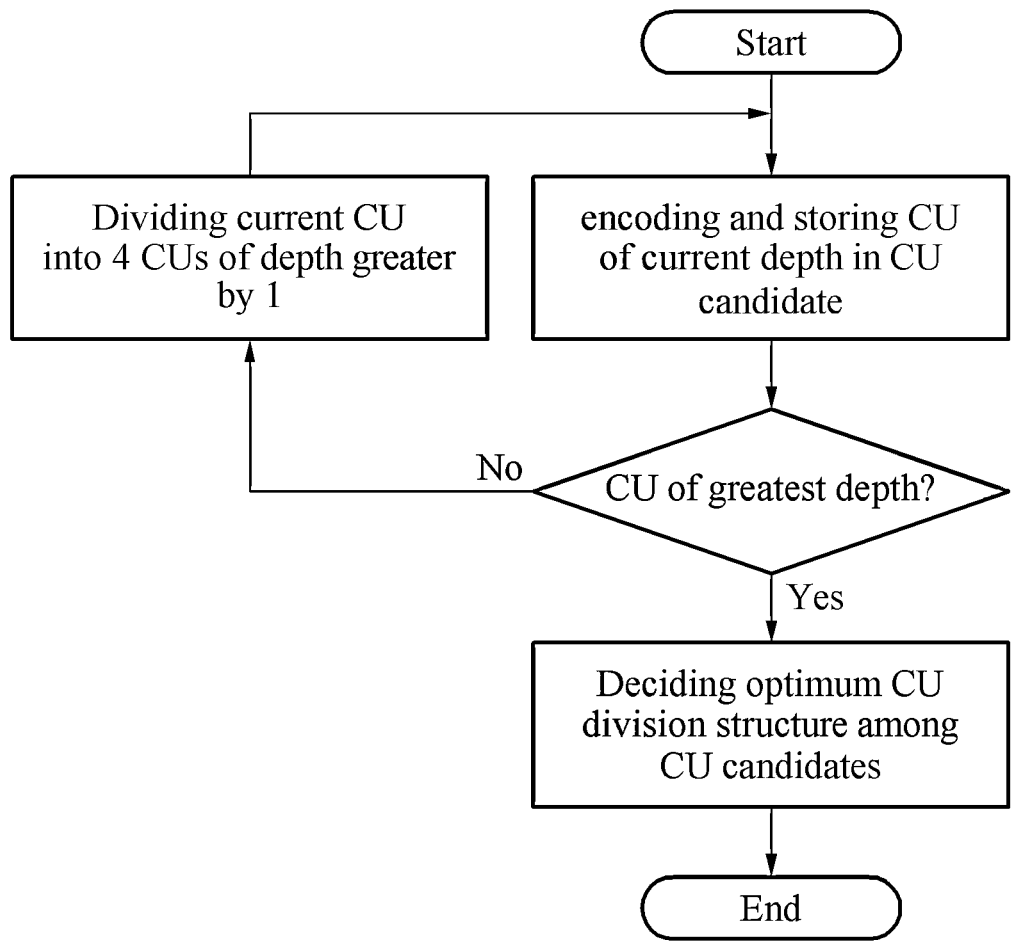
FIG. 10 is a view showing an example of determining CU division structure by LCU.

FIG. 10 shows an example of determining a CU division structure by LCU.

In a HEVC encoder, a division method of a coding unit in LCU may be decided differently according to property of an image. In other words, division structures of various cases may be encoded to decide an optimum division structure, and as a method to decide an optimum LCU division structure, a method may be used that an encoding is performed for each division depth using prediction modes (intra mode, inter mode, etc) of all coding units and then a prediction mode of the corresponding coding unit is decided according to encoded bit quantity and display quality.

For example, as shown in FIG. 9, encodings are performed by 64×64 coding unit of a division depth of 0 in intra mode, inter mode, etc, respectively, then an optimum mode is stored, a coding unit having a size of 64×64 is divided into 4 and encodings are recursively performed by each 32×32 coding unit in intra mode, inter mode, etc, respectively. In this case, prediction modes can be selected independently for each of the divided four 32×32 coding units. Further, for the 32×32 coding unit, it is divided into 4 16×16 coding units and then encodings are performed. In the recursive manner, the relevant coding unit is divided and encodings are performed, and then the most efficient division structure of a coding unit is decided in view of bit quantity and display quality.

For example, in case that bit quantity and display quality of 4 encoded 32×32 coding units are more efficient than that of an encoded 32×32 coding unit, it is decided that the coding unit is divided into 4 32×32 coding units. An optimum coding unit distribution for a number of all cases to divide an LCU is searched when an image is encoded in an encoder (i.e., an image encoding apparatus), and this acts as a factor increasing calculation complexity of the encoder.

A calculation complexity increases as an encoding efficiency is decided for a number of many cases for efficient compression performance.

Figure 11:
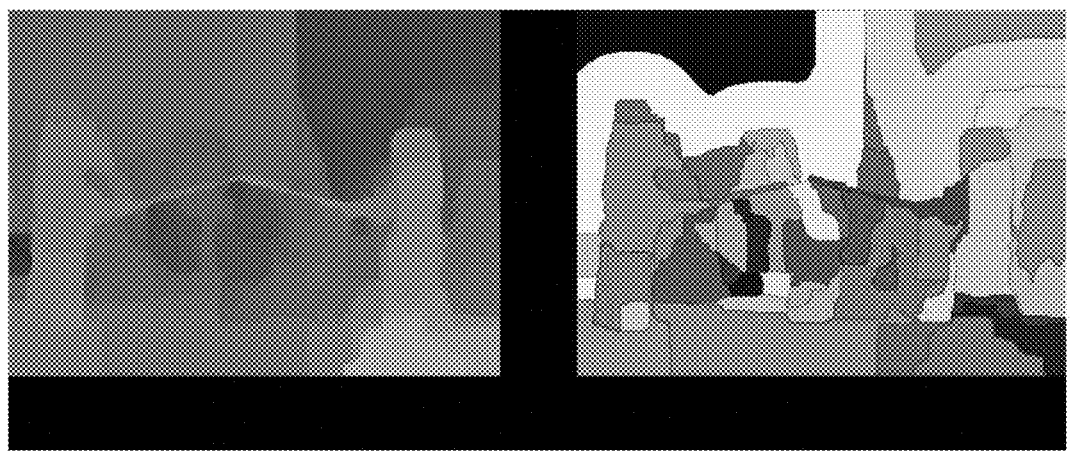
FIG. 11 is a view showing an example of a depth information image and a labeling information.

FIG. 11 is a view showing an example of a depth information image and a labeling information.

A method shown in FIG. 10 and the prior art CU division structure decision method does not consider an object information for a peripheral block. This is natural, and it is because in case of a 2D image, if there is no depth camera, an object information in the image should be extracted through a 2D image analysis, and thus a method using an object image is never loaded in the existing 2D video encoding method.

For the same reason, in case of HEVC, an encoding method using an object information is never loaded in a division structure decision method. However, if an object information is considered using a depth camera, correlation according to an object configuration information of a relevant CU is known in a division structure decision method, and thus if a division structure is decided by efficient prediction, encoding complexity is efficiently reduced.

Accordingly, in case of using a depth information for a division structure decision method, when judging an object information or a configuration of an object region of a relevant CU and predicting an efficient division structure for a relevant region, encoding complexity is efficiently reduced.

An object information induced from a depth information is obtained directly using a depth value, and alternatively, is obtained by applying a labeling algorithm to a depth information image and converting into a simple object information image. A left view of FIG. 11 shows a depth information image, and a right view of FIG. 11 shows an object information image labeled by applying a Watersherd labeling algorithm to the left view of FIG. 11.

Figure 12:
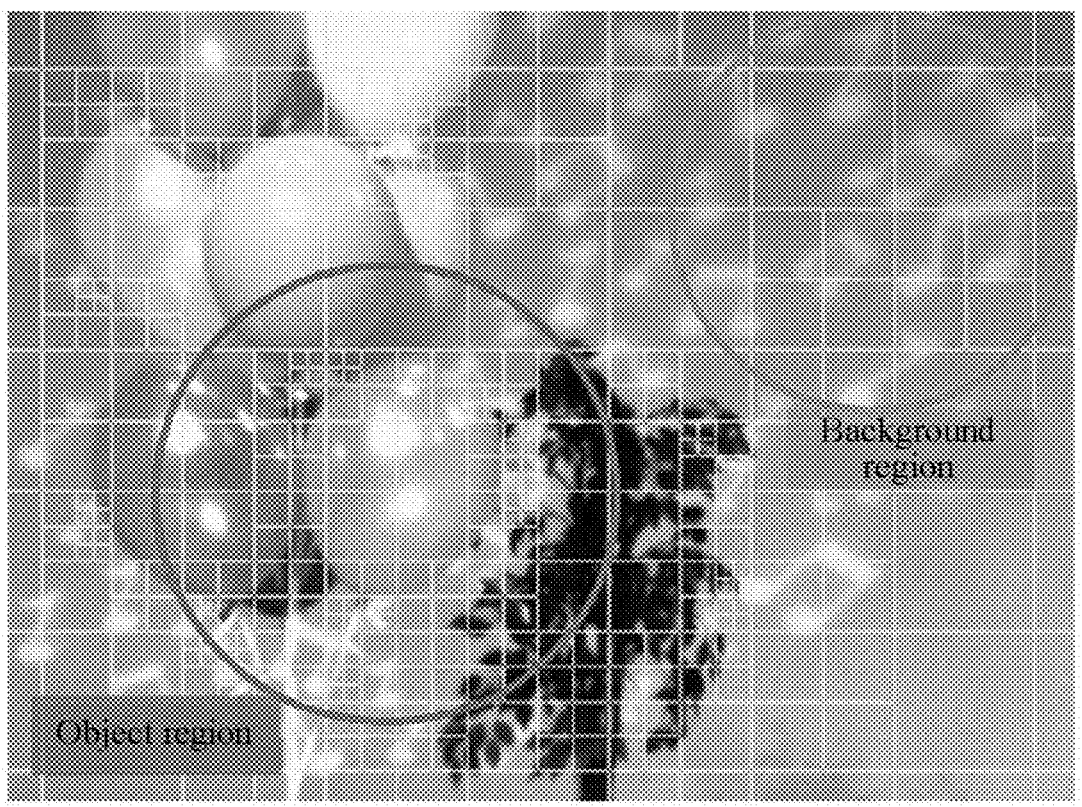
FIG. 12 is a view showing an example of a general image.
Figure 13:
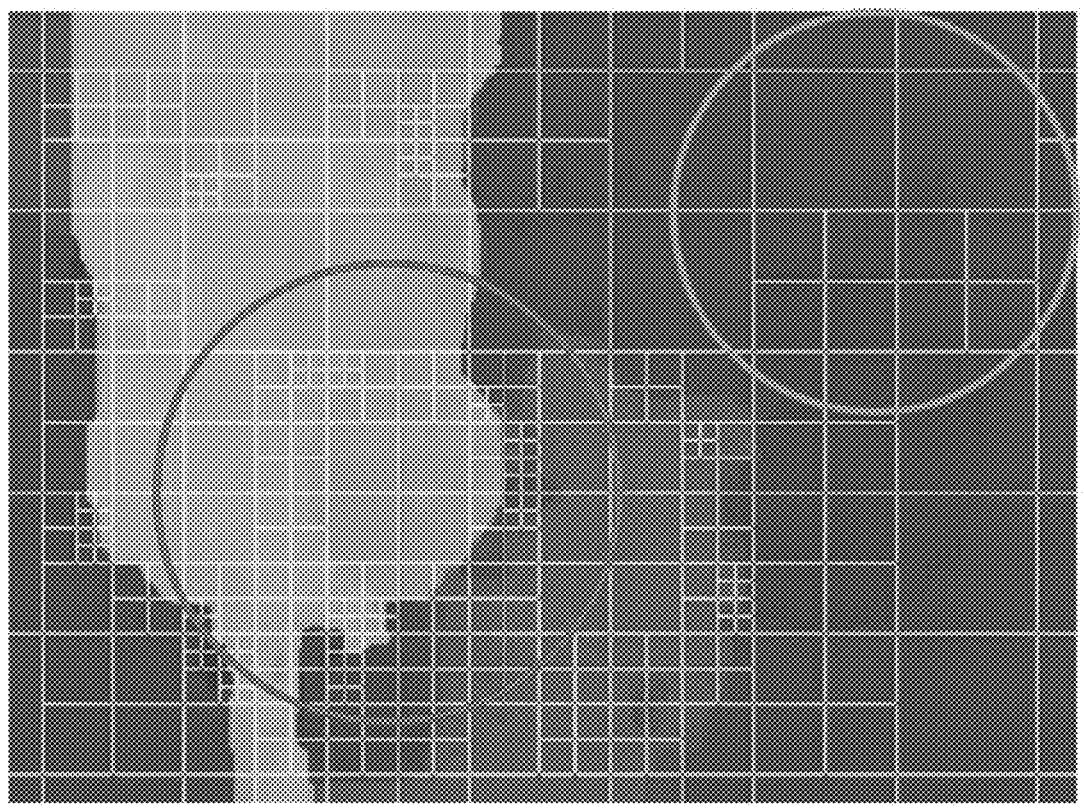
FIG. 13 is a view showing an example of a depth information map for the general image of FIG. 12.

FIG. 12 is a view showing an example of a general image. FIG. 13 is a view showing an example of a depth information map for the general image of FIG. 12.

As shown in FIGS. 12 and 13, it is quite probable that a portion corresponding to an object boundary region has a complex CU division structure, and it is quite probable that a region judged as the inside of an object or a background region has a relatively simple division structure.

Thus, in case that an object information for a currently encoded region is obtained using a depth information, it is quite probably predicted that a currently encoded region is decided to have a complex division structure formed by many CUs or to have a simple division structure formed by a few CUs. Through this, decision of a low probable division structure is limited, and thus calculation can be reduced. A method provided in the present invention can predict a division structure of high probability using a depth information and perform an encoding when determining a division structure.

In the prior art 2D video codec, algorithms are designed without reflecting using a depth information. However, since a real image and a depth information image thereof have a great correlation, based on a depth information being able to be used for an encoding of 2D image, a method of using a depth information in a 2D video encoding may be considered by developing an algorithm considering a depth information.

A basic principle of the present invention is to use a depth information of a motion prediction method to utilize a depth information obtained in a depth information camera to encode a real image for the purpose of an efficient encoding in a 2D video codec.

For example, in case of an encoding by distinguishing objects of a general image using a depth information image, encoding complexity of a general image can be greatly reduced.

The objects means several objects, and may include a background image. In a block-based encoding codec, several objects may exist in a block. Based on a depth information image, different encoding methods may be applied to respective objects.

Figure 14:
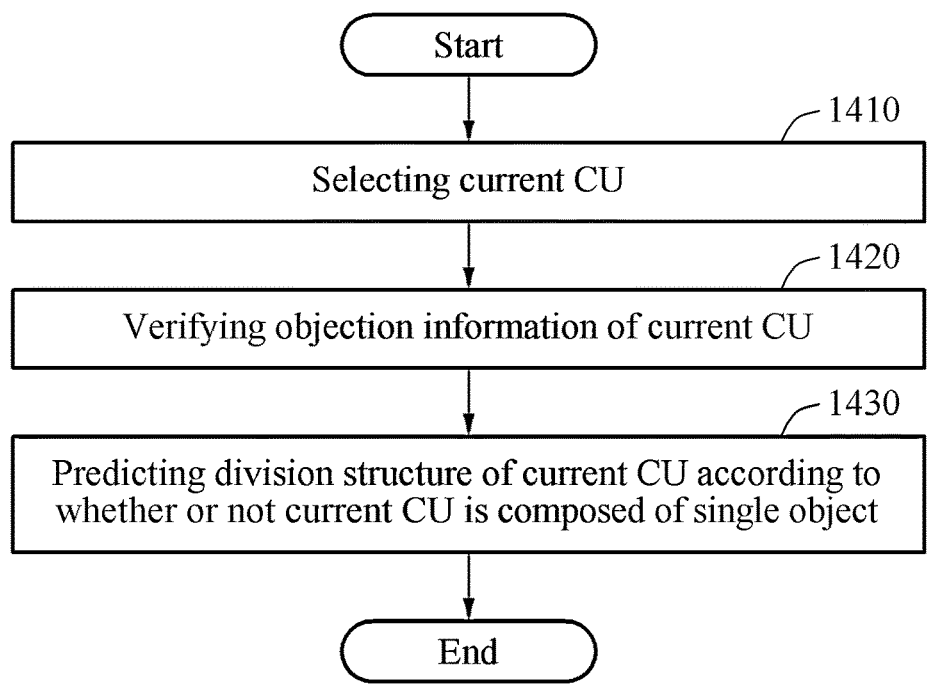
FIG. 14 shows an image encoding method according to an embodiment of the present invention.

FIG. 14 shows an image encoding method according to an embodiment of the present invention.

Referring to FIG. 14, at a step 1410, an image encoding apparatus selects a current CU that becomes a target of decision of a division structure candidate.

At a step 1420, the image encoding apparatus verifies an object information of the current CU from an object information obtained from a depth image.

At a step 1430, the image encoding apparatus verifies that the current CU is composed of a single object, and predicts a division structure of the current CU according to whether or not the current CU is a single object.

For example, the division structure of the CU predicted at the step 1430 may be (A), (B), or (D) in FIG. 9.

According to the embodiment shown in FIG. 14, the object information of the CU is judged by a depth information, and the division structure of the CU can be predicted. When it is judged that a certain CU has a single object through a depth information, a division structure candidate is decided with such the CU not divided any more, and thus encoding complexity can be reduced.

Thus, the step 1430, which predicts a division structure of the current CU, may include a process of deciding not to divide the current CU when the current CU is composed of a single object.

Further, at the step 1430, in case that the current CU and its peripheral CU are each composed of a signal object and the current CU and its peripheral CU are included in the same object, the image encoding apparatus may decide not to divide the current CU and end a division structure prediction.

Further, at the step 1430, in case that the current CU and its peripheral CU are each composed of a signal object and the current CU and its peripheral CU are included in the same object, when a size of the peripheral CU is equal to or a predetermined value, the image encoding apparatus may decide not to divide the current CU and end a division structure prediction.

Further, at the step 1430, in case that a size of the current CU is less than a predetermined value and the current CU is composed of a single object, the image encoding apparatus may decide not to divide the current CU.

Whether or not a certain CU is composed of a single object may be decided by a depth value distribution of a CU obtained from a depth information image or a label value distribution of a CU obtained from an object information label image.

For example, the case that a label value distribution of a CU is a single value, or a difference between a maximum value and a minimum value of a depth value distribution is equal to or less than a predetermined value may be judged as "an object information of a CU is a single object".

Thus, an object information may be "a label value distribution of a CU", "a depth value distribution of a CU", or "whether or not a CU is composed of a single object itself".

Figure 15:
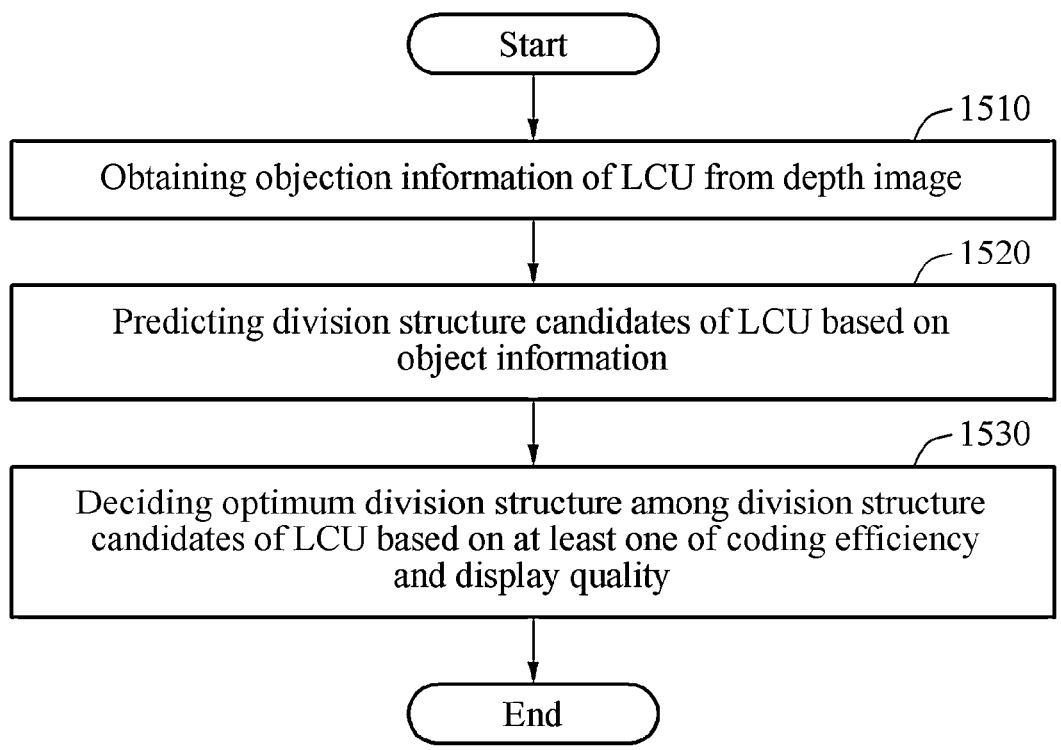
FIG. 15 is a view showing an image encoding method according to another embodiment of the present invention.

FIG. 15 shows an image encoding method according to another embodiment of the present invention.

FIG. 15 shows an example of deciding an optimum division structure by LCU.

Referring to FIG. 15, at a step 1510, an image encoding apparatus obtains an object information of an LCU from a depth image.

The object information may be a label value of an object information image that is a depth image labeled by a labeling algorithm At a step 1520, the image encoding apparatus predicts division structure candidates of the LCU based on the object information.

The step 1520 may include a process of judging whether or not a current CU is composed of a single object based on an object information of the current CU, and a process of ending a process of predicting a division structure candidate when the current CU is composed of a single object and has a size less than a predetermined value.

At a step 1530, the image encoding apparatus decides an optimum division structure among division structure candidates of the LCU based on at least one of coding efficiency and display quality.

According to the embodiment shown in FIGS. 14 and 15, a division structure of a current CU may be decided through a depth information the current CU and a reference CU.

For example, in case that a CU has a size of 32×32, when it is judged that a current CU is composed of a single object based on a depth information, an upside block and a left block of the current CU are the same object as the current CU, and a size of the upside block CU and the left block CU is equal to or 32×32, the current CU may not be divided any more, an optimum CU division structure may be decided, and it may be ended.

In case that an upside block CU and a left block CU can't be used (e.g., in case that a current CU is located at an edge of a screen so that an upside or left block CU does not exist), when a reference CU is composed of a single object and has a size of 32×32 or more, the current CU may not be divided any more, an optimum CU division structure may be decided, and it may be ended.

Further, in case that a CU has a size of 16×16, when it is judged that a current CU is composed of a single object through a depth information, the image encoding apparatus may not divide any more, decide an optimum division structure and end.

Figure 16:
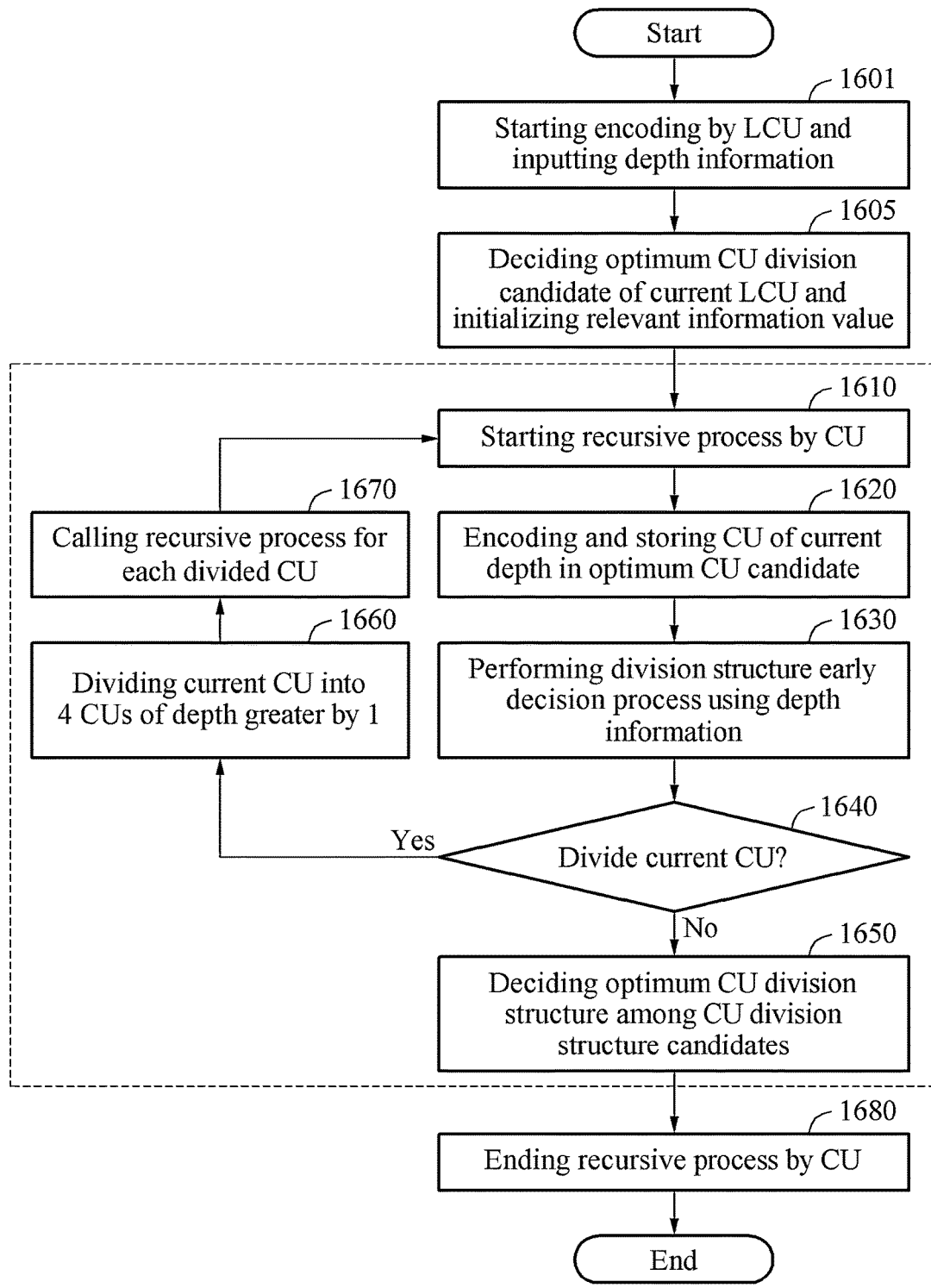
FIG. 16 is a view showing an image encoding method according to another embodiment of the present invention.

FIG. 16 shows an image encoding method according to another embodiment of the present invention.

FIG. 16 is a flow chart showing in more detail a division structure decision process by LCU shown in FIG. 15. For example, the step 1510 of FIG. 15 may include steps 1601 to 1605 of FIG. 16. Further, the step 1520 of FIG. 15 may include steps 1610 to 1630, 1660 and 1670 of FIG. 16.

At a step 1610, an image encoding apparatus starts a recursive process by CU, and at step 1620, encodes a CU of a current division depth and stores it in an optimum CU candidate. For example, a CU of a current division depth may be (A) of FIG. 9.

At a step 1630, the image encoding apparatus performs a division structure early decision process. The division structure early decision process may be a division structure candidate prediction process shown in FIGS. 14, 17 and 18.

Diving a CU may be decided through the division structure early decision process at the step 1630, and at this time, at a step 1660, a CU may be divided into 4 CUs a division depth of which is greater by 1, as shown in (B) of FIG. 9.

In case that a recursive process by CU being gone through CU division structure candidates are decided as (A), (B) and (C) of FIG. 9, the image encoding apparatus may decide an optimum division structure at step 1650 considering coding efficiency, etc for each division structure candidate.

When an optimum division structure is decided, a recursive process by CU may be ended at a step 1680.

Figure 17:
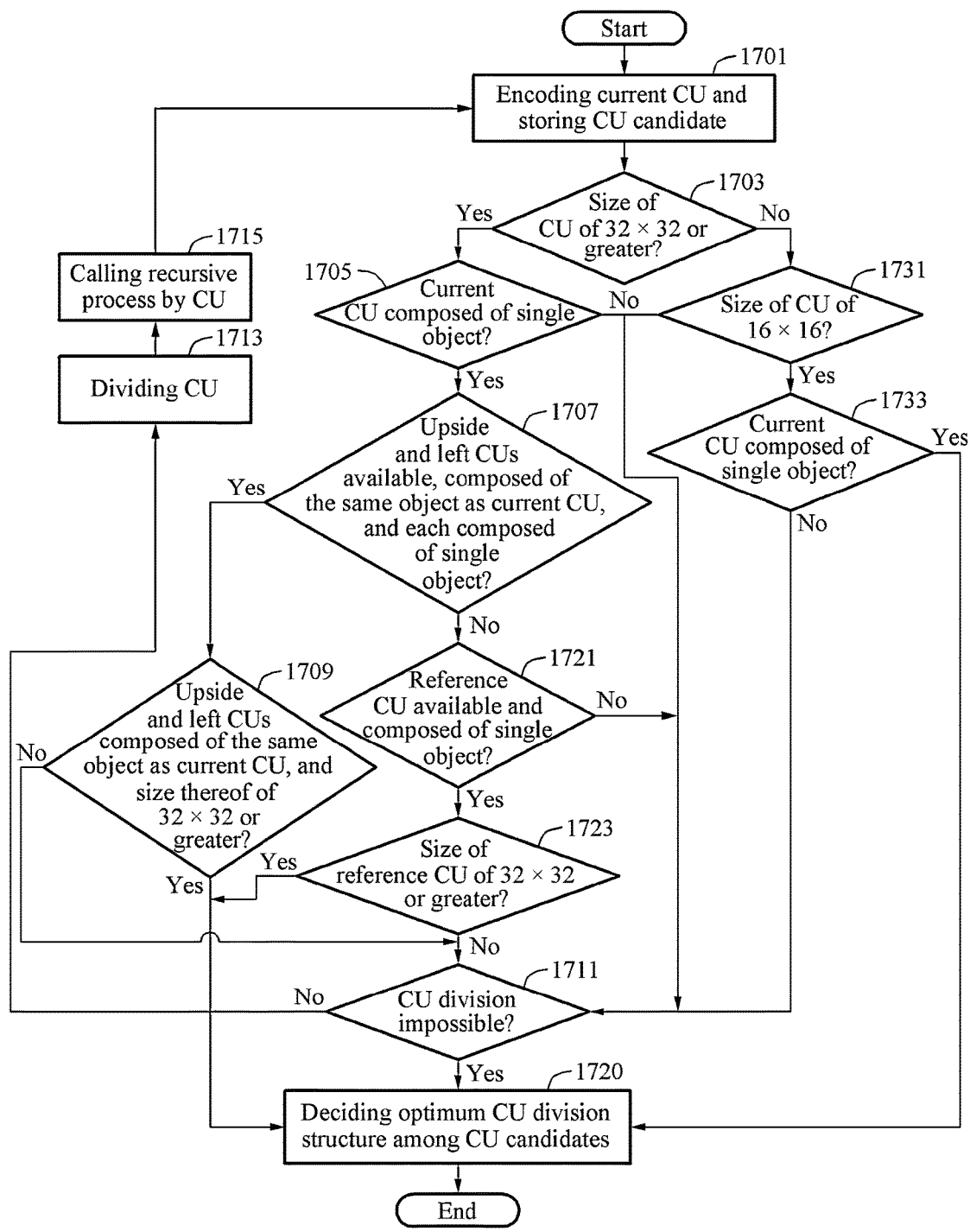
FIGS. 17 and 18 are flow charts illustrating examples of a division structure prediction process according to an embodiment of the present invention.
Figure 18:
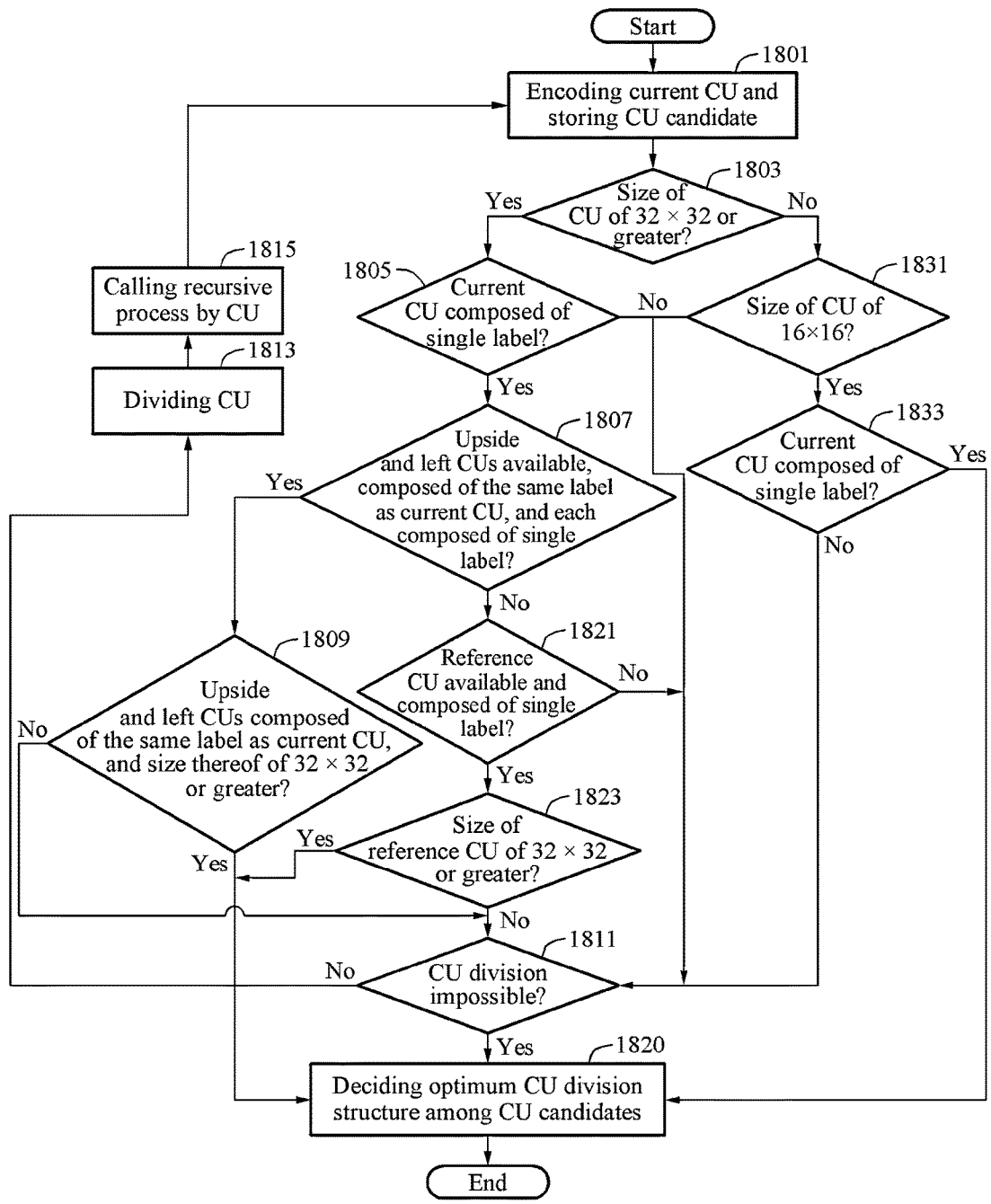

FIGS. 17 and 18 are flow charts illustrating examples of a division structure prediction process according to an embodiment of the present invention.

Referring to FIG. 17, a step 1701 that encodes a current CU and stores a CU candidate may be the same as the step 1605 of FIG. 16.

At a step 1703, the image encoding apparatus selects a current CU and judges whether or not a size of the current CU is 32×32 or more.

When the size of the current CU is 32×32 or more, a step 1705 is performed, and otherwise, a step 1731 is performed.

At the step 1705, whether or not the current CU is composed of a single object is judged, and when it is composed of a single object, a step 1707 is performed, and otherwise, a step 1711 is performed.

At the step 1707, it is judged whether or not an upside CU and a left CU of the current CU are available and are each composed of the same object as the current CU.

If a condition of the step 1707 is satisfied, a step 1709 is performed, and otherwise, a step 1721 is performed.

At a step 1709, the upside CU and the left CU of peripheral CUs have a size of 32×32 or more, not dividing a current CU any more is decided, and a step 1720 that performs an optimum division structure may be performed.

If at the step 1709, the upside CU and the left CU have a size less than 32×32, a step 1711 is performed.

At the step 1711, when a division is possible with reference to a division depth of the current CU, the CU is divided at a step 1713, and a recursive process call at a step 1715 is performed.

At the step 1711, when a division depth of the current CU is the largest division depth and no more division of the CU, the step 1720 may be performed.

Referring to the steps 1703 and 1705, the image encoding method according to the embodiment includes a step that judges whether or not a current CU is composed of a single object based on an object information of the current CU when a size of the current CU is equal to or a predetermined value.

Further, referring to the steps 1707, 1709 and 1721, the image encoding method according to the embodiment includes a step that, when a current CU is composed of a single object, verifies an object information of a peripheral CU of the current CU or a reference CU of the current CU, and predicts a division structure of the current CU based on the object information of the peripheral CU or the object information of the reference CU.

In this regard, the peripheral CU is the upside CU and the left CU of the current CU, the step of predicting the division structure of the current CU may includes a step that judges whether the upside CU and the left CU are each composed of a single object, and a step that decides not to divide the current CU when the upside CU and the left CU are each composed of a single object and a size of the upside CU and the left CU is equal to or a predetermined value and decides to divide the current CU in one more level when the size of the upside CU and the left CU is less than a predetermined value.

At the step 1707, when the upside CU and the left CU are not each composed of a single object, whether the reference CU is composed of a single object may be judged at the step 1721.

In more detail, when it is judged that the reference CU is available and is composed of a single object at the step 1721, whether or not a size of the reference CU is equal to or 32×32 may be judged at the step 1723.

When it is judged that the size of the reference CU is equal to or 32×32 at the step 1723, not dividing the current CU any more is decided, and the step 1720 that decides an optimum CU division structure may be performed.

Referring to the steps 1721 and 1723, the image encoding method according to the embodiment may include a step that decides not to divide a current CU when a reference CU is composed of a single object and has a size equal to or greater than a predetermined value, and decides to divide the current CU in one more level when the reference CU is not composed of a single object. To divide the current CU in one more level means to divide the current CU to 4 CUs a division depth of which increases by 1.

When a size of a CU is less than 32×32 at the step 1703, whether or not the size of the CU is 16×16 is judged at the step 1731, and when the size of the CU is 16×16, whether or not a current CU is composed of a single object is judged at the step 1733.

When it is judged that the current CU is composed of a single object at the step 1733, not dividing the current CU any more may be decided, and the step 1720 step that decides an optimum CU division structure may be performed.

According to the embodiment of the present invention, as a method to judge the same object and a single object, provided may be a method that applies a labeling algorithm to a depth information and obtains an object information from a depth information label image. The object information is expressed as labels, and thus whether or not labels are equal to each other can be judged, and regarding an object configuration, through a label distribution at an object region, the same object and a single object can be judged.

Thus, an object information of a current CU, an object information of a peripheral CU, and an object information of a reference CU may be label values of an object information image that is a depth image labeled by a labeling algorithm.

Referring to FIG. 18, steps 1801, 1820, 1813 and 1815 are the same as the steps 1701, 1720, 1713 and 1715 of FIG. 17, respectively.

At a step 1803, the image encoding apparatus selects a current CU and judges whether or not a size of the current CU is 32×32 or more.

When the size of the current CU is 32×32 or more, a step 1805 is performed, and otherwise, a step 1831 is performed.

At the step 1805, whether or not the current CU is composed of a single label is judged, and when it is composed of a single label, a step 1807 is performed, and otherwise, a step 1811 is performed.

A single level may be set as a case that label values included in a CU are all the same, or a difference between a maximum value and a minimum value is within a predetermined value.

At the step 1807, it is judged whether or not an upside CU and a left CU of the current CU are available and are each composed of the same label as the current CU.

If a condition of the step 1807 is satisfied, a step 1809 is performed, and otherwise, a step 1821 is performed.

At a step 1809, the upside CU and the left CU of peripheral CUs have a size of 32×32 or more, not dividing a current CU any more is decided, and a step 1820 that performs an optimum division structure may be performed.

If at the step 1809, the upside CU and the left CU have a size less than 32×32, a step 1811 is performed.

At the step 1811, when a division is possible with reference to a division depth of the current CU, the CU is divided at a step 1813, and a recursive process call at a step 1815 is performed.

At the step 1811, when a division depth of the current CU is the largest division depth and no more division of the CU, the step 1820 may be performed.

Referring to the steps 1803 and 1805, the image encoding method according to the embodiment includes a step that judges whether or not a current CU is composed of a single label based on an object information of the current CU when a size of the current CU is equal to or greater than a predetermined value.

Further, referring to the steps 1807, 1809 and 1821, the image encoding method according to the embodiment includes a step that, when a current CU is composed of a single label, verifies an object information of a peripheral CU of the current CU or a reference CU of the current CU, and predicts a division structure of the current CU based on the object information of the peripheral CU or the object information of the reference CU.

In this regard, the peripheral CU is the upside CU and the left CU of the current CU, the step of predicting the division structure of the current CU may includes a step that judges whether the upside CU and the left CU are each composed of a single label, and a step that decides not to divide the current CU when the upside CU and the left CU are each composed of a single label and a size of the upside CU and the left CU is equal to or greater than a predetermined value and decides to divide the current CU in one more level when the size of the upside CU and the left CU is less than a predetermined value.

At the step 1807, when the upside CU and the left CU are not each composed of a single label, whether the reference CU is composed of a single label may be judged at the step 1821.

In more detail, when it is judged that the reference CU is available and is composed of a single label at the step 1821, whether or not a size of the reference CU is equal to or greater than 32×32 may be judged at the step 1823.

When it is judged that the size of the reference CU is equal to or greater than 32×32 at the step 1823, not dividing the current CU any more is decided, and the step 1820 that decides an optimum CU division structure may be performed.

Referring to the steps 1821 and 1823, the image encoding method according to the embodiment may include a step that decides not to divide a current CU when a reference CU is composed of a single label and has a size equal to or greater than a predetermined value, and decides to divide the current CU in one more level when the reference CU is not composed of a single label. To divide the current CU in one more level means to divide the current CU to 4 CUs a division depth of which increases by 1.

When a size of a CU is less than 32×32 at the step 1803, whether or not the size of the CU is 16×16 is judged at the step 1831, and when the size of the CU is 16×16, whether or not a current CU is composed of a single label is judged at the step 1833.

When it is judged that the current CU is composed of a single label at the step 1833, not dividing the current CU any more may be decided, and the step 1820 step that decides an optimum CU division structure may be performed.

Figure 19:
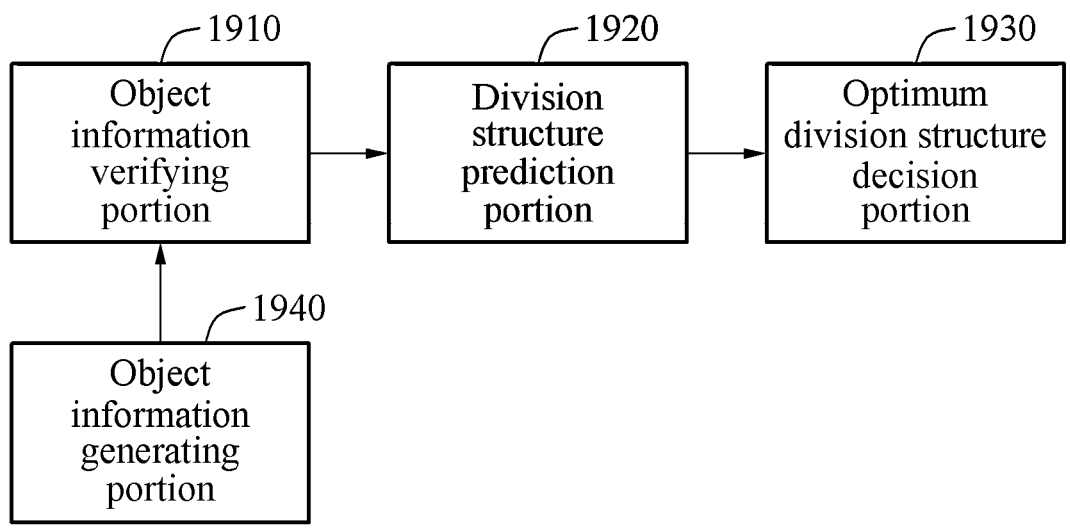
FIG. 19 is a view illustrating a configuration of an image encoding apparatus according to an embodiment of the present invention.

FIG. 19 is a view illustrating a configuration of an image encoding apparatus according to an embodiment of the present invention.

Referring to FIG. 19, an image encoding apparatus 1900 may include an object information verifying portion 1910, a division structure prediction portion 1920, and an optimum division structure decision portion 19320. Further, the image encoding apparatus 1900 may include an object information generating portion that obtains a label value of an object information image that is a depth information image labeled by a labeling algorithm.

The object information verifying portion 1910 may extract an object information of a current CU from an object information obtained from a depth image and verify the objection information of the current CU.

Further, the object information verifying portion 1910 may verify a size of the current CU, and verify whether or not the current CU is composed of a single object based on the object information of the current CU obtained from the depth image when the size of the current CU is equal to or greater than a predetermined value.

Further, the division structure prediction portion 1920 may predict division structure candidates of the LCU based on the objection information.

The optimum division structure decision portion 1930 decides an optimum division structure among the division structure candidates based on at least one of coding efficiency and display quality.

Table 1 illustrates an experimental result where the embodiment shown in FIG. 18 is applied to HEVC.

It is verified through the experimental result that complexity of the encoding is reduced without great deterioration in image quality

TABLE 1

|  |  | Low-delay Main | | | | Random-access Main | | | |
| --- | --- | --- | --- | --- | --- | --- | --- | --- | --- |
|  |  | Y BD-rate | U BD-rate | V BD-rate | Encoding Time | Y BD-rate | U BD-rate | V BD-rate | Encoding Time |
| 3DV | Balloons | 0.2% | 0.3% | 0.2% | 66.0% | 0.5% | 0.7% | 0.8% | 60.5% |
| Test | Kendo | 0.3% | 0.9% | 0.8% | 61.9% | 0.3% | 0.7% | 0.4% | 56.3% |
| Sequences | Newspaper_CC | 0.0% | 0.3% | 0.0% | 73.4% | 0.0% | −0.4% | −0.1% | 74.7% |
|  | Poznan_Hall2 | 1.0% | 1.5% | 1.1% | 55.0% | 2.1% | 0.7% | −0.5% | 50.8% |
|  | Poznan_Street | 0.2% | −1.2% | 0.5% | 84.9% | 0.4% | 0.2% | −0.2% | 79.1% |
|  | Undo_Dancer | 0.1% | 1.1% | 0.5% | 83.5% | 0.3% | −0.6% | −0.4% | 81.6% |
| 1024X768 Average | | 0.2% | 0.5% | 0.3% | 67.1% | 0.3% | 0.3% | 0.4% | 63.8% |
| 1920X1088 Average | | 0.4% | 0.4% | 0.7% | 74.5% | 0.9% | 0.1% | −0.3% | 70.5% |
| 3DV Average | | 0.3% | 0.5% | 0.5% | 70.8% | 0.6% | 0.2% | 0.0% | 67.2% |

Further, the object information verifying portion 1910 may extract an object information of an LCU from a depth image and verify the objection information of the LCU.

The division structure prediction portion 1920 may verify whether or not the current CU is composed of a single object based on the object information, and predict a division structure of the current CU according to whether or not the current CU is composed of a single object.

The division structure prediction portion 1920 may decide not to divide the current CU when the current CU is composed of a single object.

The division structure prediction portion 1920 may decide not to divide the current CU and end a division structure prediction when the current CU and a peripheral CU of the current CU are each composed of a single object and are included in the same object.

Further, the division structure prediction portion 1920 may decide not to divide the current CU and end a division structure prediction when the current CU, a peripheral CU of the current CU are each composed of a single object and are included in the same object and a size of the peripheral CU is equal to or greater than a predetermined value.

Further, the division structure prediction portion 1920 may decide not to divide the current CU when a size of the current CU is less than a predetermined value and is composed of a single object.

Further, the division structure prediction portion 1920 may verify an object information of the peripheral CU of the current CU or an object information of a reference CU of the current CU, and predict a division structure of the current CU based on the object information of the peripheral CU or the object information of the reference CU, when the current CU is composed of a single object.

In embodiments of the present invention, an object scope or an application scope may vary according to a block size or a division depth of a CU, etc.

Here, a variable determining an application scope (i.e. a size or a depth information) may be set such that an apparatus of encoding and an apparatus of decoding use a predetermined value or a value determined according to a profile or a level. Alternatively, a variable determining an application scope (i.e. a size or a depth information) may be set such that an apparatus of encoding writes a variable value on a bitstream and an apparatus of decoding reads the value from the bitstream. Table 2 illustrates a case where an application scope varies according to a CU division depth. A method A may be a method applied to only a depth equal to or a predetermined depth value, a method B may be a method applied to only a depth equal to or smaller than a predetermined depth value, and a method C may be method applied to only a predetermined depth value.

TABLE 2

| CU depth representing application scope | method A | method B | method C |
| --- | --- | --- | --- |
| 0 | X | O | X |
| 1 | X | O | X |
| 2 | O | O | O |
| 3 | O | X | X |
| 4 | O | X | X |

Table 2 illustrates an example of methods of determining an application scope for a method of the present disclosure when a CU division depth is 2. (O: applied to the corresponding depth, X: not applied to the corresponding depth)

When the methods of the present disclosure are not applied to all depths, a flag may be written on the bitstream. Alternatively, when the methods of the present disclosure are not applied to all depths, the variable may be expressed by signaling a value the maximum of the CU depths by one with a CU depth value representing the application scope.

In addition, the above methods may be differently applied to a chrominance block according to a size of a brightness block and may be differently applied to a brightness signal image and a chrominance image.

Table 3 illustrates an examples where methods are differently applied according a size of a brightness block and a chrominance block when the methods are combined.

TABLE 3

| size of brightness block | size of chrominance block | application of brightness | application of chrominance | methods |
|---|---|---|---|---|
| 4(4 × 4, 4 × 2, 2 × 4) | 2(2 × 2) | ○ or X | ○ or X | a 1, 2, . . . |
| | 4(4 × 4, 4 × 2, 2 × 4) | ○ or X | ○ or X | b 1, 2, . . . |
| | 8(8 × 8, 8 × 4, 4 × 8, 2 × 8, etc.) | ○ or X | ○ or X | c 1, 2, . . . |
| | 16(16 × 16, 16 × 8, 4 × 16, 2 × 16, etc.) | ○ or X | ○ or X | d 1, 2, . . . |
| | 32(32 × 32) | ○ or X | ○ or X | e 1, 2, . . . |
| 8(8 × 8, 8 × 4, 2 × 8, etc.) | 2(2 × 2) | ○ or X | ○ or X | f 1, 2, . . . |
| | 4(4 × 4, 4 × 2, 2 × 4) | ○ or X | ○ or X | g 1, 2, . . . |
| | 8(8 × 8, 8 × 4, 4 × 8, 2 × 8, etc.) | ○ or X | ○ or X | h 1, 2, . . . |
| | 16(16 × 16, 16 × 8, 4 × 16, 2 × 16, etc.) | ○ or X | ○ or X | i 1, 2, . . . |
| | 32(32 × 32) | ○ or X | ○ or X | j 1, 2, . . . |
| 16(16 × 16, 8 × 16, 4 × 16, etc.) | 2(2 × 2) | ○ or X | ○ or X | k 1, 2, . . . |
| | 4(4 × 4, 4 × 2, 2 × 4) | ○ or X | ○ or X | l 1, 2, . . . |
| | 8(8 × 8, 8 × 4, 4 × 8, 2 × 8, etc.) | ○ or X | ○ or X | m 1, 2, . . . |
| | 16(16 × 16, 16 × 8, 4 × 16, 2 × 16, etc.) | ○ or X | ○ or X | n 1, 2, . . . |
| | 32(32 × 32) | ○ or X | ○ or X | o 1, 2, . . . |

Referring to a method g1 among modified methods of Table 3, when a size of a brightness block is 8 (8×8, 8×4, 2×8, etc.) and a size of a chrominance block is 4 (4×4, 4×2, 2×4, etc.), a method of constituting a merge list according to an embodiment of the present disclosure may be applied to a brightness signal and a chrominance signal.

Referring to a method l2 among the above modified methods, when a size of a brightness block is 16 (16×16, 8×16, 4×16, etc.) and a size of a chrominance block is 4 (4×4, 4×2, 2×4, etc.), a method of constituting a merge list according to an embodiment of the present disclosure may be applied to a brightness signal and may not be applied to a chrominance signal.

In addition, a method of constituting a merge list according to an embodiment of the present disclosure may be applied to a brightness signal and may not be applied to a chrominance signal by the other modified methods. On the contrary, a method of constituting a merge list according to an embodiment of the present disclosure may be applied to a chrominance signal and may not be applied to a brightness signal.

According to an embodiment of the present disclosure, efficient encoding of a two-dimensional image may be performed by encoding a two-dimensional general image using a depth information image obtained from a depth information camera.

An apparatus illustrated above may include a hardware element, a software element and/or a combination of a hardware element and a software element. For example, an apparatus and an element illustrated in an embodiment may include at least one general-purpose computer or at least one special-purpose computer such as a processor, a controller, an arithmetic logic unit (ALU), a digital signal processor, a microcomputer, a field programmable array (FPA), a programmable logic unit (PLU), a microprocessor or another apparatus which can perform an instruction and response. A processing unit may perform an operation system (OS) and at least one software application performed in the operating system. In addition, a processing unit may access, store, operate, process and generate a data in response to performance of a software. For convenience of understanding, although it is illustrated that a single processing unit is used, it is well known to those skilled in the corresponding technical field that a processing unit may include a plurality of processing elements and/or a plural kind of processing element. For example, a processing unit may include a plurality of processors or a processor and a controller. In addition, a processing unit may include another processing configuration such as a parallel processor.

A software may include a computer program, a code, an instruction or a combination of at least one thereof and may constitute a processing unit to operate as required or may order a processing unit independently or collectively. A software and/or a data may be permanently or temporarily embodied in a kind of machine, a component, a physical equipment, a virtual equipment, computer storage media, a computer storage equipment or a transmitted signal wave for being interpreted by a processing unit or providing an instruction or a data to a processing unit. A software may be dispersed in a computer system connected by a network to be stored or executed through a dispersed method.

A method according to an embodiment may be embodied as a form of a program instruction executable through various computer means to be stored in computer readable media. The computer readable media may include a program instruction, a data file, a data structure and a combination thereof. The program instruction recorded in the media may be designed and constituted specifically for an embodiment or may be well known to those skilled in a computer software to be usable. Examples of the computer readable media may include magnetic media such as a hard disk, a floppy disk, and a magnetic tape; optical media such as a CD-ROM and a DVD; magneto-optical media such as a floptical disk; and hardware equipments that are specially configured to store and perform a program instruction such as a ROM, a RAM, a flash memory, etc.

Although embodiments are illustrated with a limited number of embodiments and drawings, it will be apparent to those skilled in the art that various modifications and variations can be made from the above description. For example, a proper result may be obtained even when illustrated technologies are performed in an order different from the illustrated method and/or even when illustrated elements such as a system, a structure, a circuit, etc. are combined or mixed as a form different from the illustrated method or are substituted or replaced with different elements or equivalents.

Thus, it is intended that the present disclosure cover the modifications and variations of this disclosure provided they come within the scope of the appended claims and their equivalents.

What is claimed is:

1. A method for encoding an image using a depth information, the method comprising:
   selecting a current coding unit (CU);
   verifying an object information of the current CU from an object information obtained from a depth image; and
   verifying whether or not the current CU is composed of a single object based on the object information, and predicting a division structure of the current CU according to whether or not the current CU is composed of a single object,
   wherein predicting the division structure of the current CU comprises a process that decides not to divide the current CU and ends a division structure prediction when the current CU and a peripheral CU of the current CU are each composed of a single object and are included in the same object.

2. The method according to claim 1, wherein predicting the division structure of the current CU comprises a process that decides not to divide the current CU when the current CU has a size less than a predetermined value and is composed of a single object.

3. A method for encoding an image using a depth information, the method comprising:
   selecting a current coding unit (CU);
   verifying an object information of the current CU from an object information obtained from a depth image; and
   verifying whether or not the current CU is composed of a single object based on the object information, and predicting a division structure of the current CU according to whether or not the current CU is composed of a single object,
   wherein predicting the division structure of the current CU comprises a process that decides not to divide the current CU and ends a division structure prediction when the current CU and a peripheral CU of the current CU are each composed of a single object and are included in the same object, and a size of the peripheral CU is equal to or greater than a predetermined value.

4. An apparatus for encoding an image using a depth information, the apparatus comprising:
   an object information verifying portion that verifies an object information of a current coding unit (CU) from an object information obtained from a depth image; and
   a division structure prediction portion that verifies whether or not the current CU is composed of a single object based on the object information, and predicts a division structure of the current CU according to whether or not the current CU is composed of a single object,
   wherein the division structure prediction portion decides not to divide the current CU and ends a division structure prediction when the current CU and a peripheral CU of the current CU are each composed of a single object and are included in the same object.

5. The apparatus according to claim 4, wherein the division structure prediction portion decides not to divide the current CU when the current CU has a size less than a predetermined value and is composed of a single object.

6. An apparatus for encoding an image using a depth information, the apparatus comprising:
   an object information verifying portion that verifies an object information of a current coding unit (CU) from an object information obtained from a depth image; and
   a division structure prediction portion that verifies whether or not the current CU is composed of a single object based on the object information, and predicts a division structure of the current CU according to whether or not the current CU is composed of a single object,
   wherein the division structure prediction portion decides not to divide the current CU and ends a division structure prediction when the current CU and a peripheral CU of the current CU are each composed of a single object and are included in the same object, and a size of the peripheral CU is equal to or greater than a predetermined value.

* * * * *